US010531506B2

(12) United States Patent
Garrett et al.

(10) Patent No.: US 10,531,506 B2
(45) Date of Patent: Jan. 7, 2020

(54) COLLABORATIVE OPERATION OF SOFTWARE DEFINED RADIOS

(71) Applicant: AVAGO TECHNOLOGIES INTERNATIONAL SALES PTE. LIMITED

(72) Inventors: David C. Garrett, Tustin, CA (US); Franciscus Van Der Goes, Zeist (NL); Hooman Darabi, Laguna Niguel, CA (US); Ramon A. Gomez, San Jose, CA (US); Murat Mese, Rancho Palos Verdes, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 38 days.

(21) Appl. No.: 15/043,107

(22) Filed: Feb. 12, 2016

(65) Prior Publication Data

US 2017/0207800 A1     Jul. 20, 2017

Related U.S. Application Data

(60) Provisional application No. 62/279,424, filed on Jan. 15, 2016.

(51) Int. Cl.
  *H04W 76/15*     (2018.01)
(52) U.S. Cl.
  CPC .................................. *H04W 76/15* (2018.02)
(58) Field of Classification Search
  CPC ........................... H04B 1/0003; H04W 76/025
  See application file for complete search history.

(56) References Cited

U.S. PATENT DOCUMENTS

| 6,590,884 | B1* | 7/2003 | Panasik | G01S 3/72 |
| | | | | 370/312 |
| 7,574,236 | B1* | 8/2009 | Mansour | H04B 7/0413 |
| | | | | 455/562.1 |
| 2010/0056200 | A1* | 3/2010 | Tolonen | H04B 1/3805 |
| | | | | 455/552.1 |
| 2011/0312327 | A1* | 12/2011 | Kubota | H04W 36/20 |
| | | | | 455/436 |
| 2013/0109448 | A1* | 5/2013 | Garrett | H04B 7/0617 |
| | | | | 455/575.7 |
| 2015/0049616 | A1* | 2/2015 | Ho | H04W 24/02 |
| | | | | 370/252 |

(Continued)

OTHER PUBLICATIONS

Cox, Christopher An Introduction to LTE, LTE-Advanced, SAE VoLTE and 4 G Mobile Commuinications Wiley 2nd Edition Jul. 28, 2014.*

(Continued)

*Primary Examiner* — Jeffrey M Rutkowski
*Assistant Examiner* — Basil Ma
(74) *Attorney, Agent, or Firm* — Xsensus LLP

(57) ABSTRACT

A device includes circuitry configured to implement one or more PHY communications protocols to simultaneously communicate with one or more stations via communication links on one or more wireless networks, communicate with additional devices via a backhaul network, and exchange collaboration data, including at least one of protocol data or collaborative beamforming data, with the additional devices via the backhaul network to maintain signal parameters of communications signals with the one or more stations.

16 Claims, 10 Drawing Sheets

(56) References Cited

U.S. PATENT DOCUMENTS

| | | | | |
|---|---|---|---|---|
| 2015/0078353 A1* | 3/2015 | Zhang | ............... | H04W 28/0236 |
| | | | | 370/336 |
| 2015/0288428 A1* | 10/2015 | Choi | ...................... | H04B 7/024 |
| | | | | 370/329 |
| 2017/0127404 A1* | 5/2017 | Merlin | ............... | H04W 72/0413 |
| 2017/0181010 A1* | 6/2017 | Burgess | ................ | H04W 72/12 |

OTHER PUBLICATIONS

Berezin et al. Multichannel Virtual Access Points for Seamless Handoffs in IEEE 802.11 Wireless Networks 2011 IEEE Vehicular Technology Conference May 15-18, 2011 Budapest, Hungary.*

* cited by examiner

US 10,531,506 B2

COLLABORATIVE OPERATION OF SOFTWARE DEFINED RADIOS

CROSS-REFERENCE TO RELATED PATENT APPLICATIONS

The present application claims the benefit of the earlier filing date of U.S. provisional application 62/279,424 having common inventorship with the present application and filed in the U.S. Patent and Trademark Office on Jan. 15, 2016, the entire contents of which being incorporated herein by reference.

BACKGROUND

Technical Field

The present disclosure relates to software defined radio (SDR), specifically a device, system, and method for collaboratively operating SDRs.

Description of the Related Art

Software defined radio (SDR) provides the opportunity to develop fully programmable wireless communication systems, effectively supplanting conventional radio technologies, which typically have the lowest communication layers implemented in primarily in fixed, custom hardware circuits. In conventional radio implementations, as wireless communication devices move from one location to the next, the devices perform handoff procedures with access points to transfer control between wireless access points. When errors occur during the handoff process, the devices lose access to the wireless communication network.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
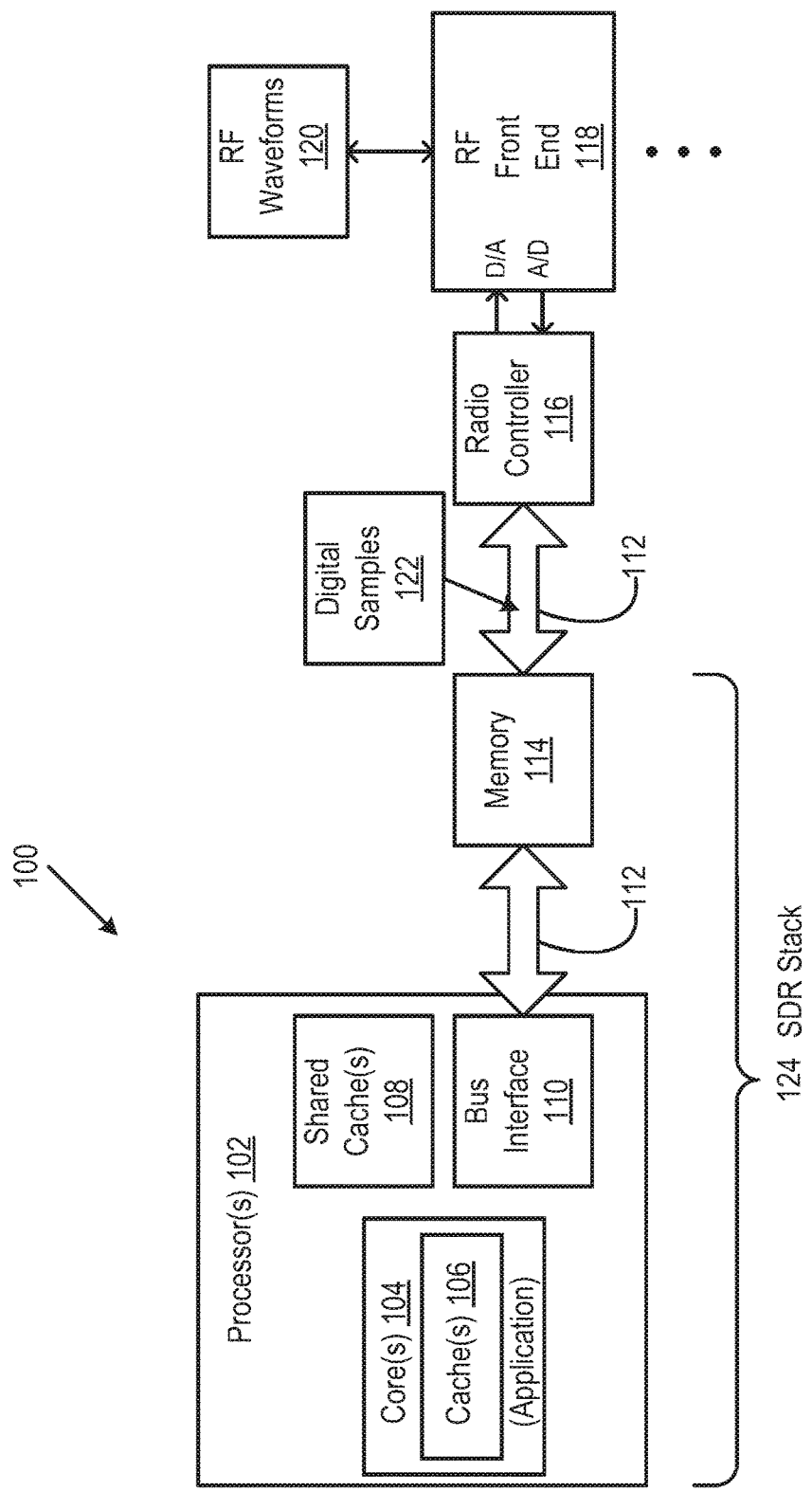
FIG. 1 is an exemplary illustration of a software defined radio (SDR) architecture, according to certain embodiments.

In the drawings, like reference numerals designate identical or corresponding parts throughout the several views. Further, as used herein, the words "a," "an" and the like generally carry a meaning of "one or more," unless stated otherwise.

In an exemplary implementation, a device includes circuitry configured to implement one or more PHY communications protocols to simultaneously communicate with one or more stations via communication links on one or more wireless networks, communicate with additional devices via a backhaul network, and exchange collaboration data with the additional devices via the backhaul network to maintain signal parameters of communications signals with the one or more stations.

In another exemplary implementation, a method includes implementing one or more PHY communications protocols to simultaneously communicate with one or more stations via communication links on one or more wireless networks; communicating with additional devices via a backhaul network; and exchanging collaboration data with the additional devices via the backhaul network to maintain signal parameters of communications signals with the one or more stations.

In another exemplary implementation, a device includes circuitry configured to modulate one or more coded spatial streams of a first multi-input, multi-output (MIMO) signal to a first station at a first frequency via one or more antennas, forward one or more additional coded spatial streams of the first MIMO signal at the first frequency to another device via a backhaul network, and coordinate, with the another device, simultaneous transmission of a plurality of MIMO signals to a plurality of stations on a plurality of frequencies.

Aspects of the present disclosure are directed to collaborative operations of software defined radios (SDRs). In some implementations, the SDRs are included in access points for multiple wireless communication networks and can be used to replicate one PHY protocols that are compatible with stations that include user equipment (UE), base stations, and the like so that station connections can be transferred between the access points without having to perform handoff procedures. In addition, SDRs can be included in access points having multiple antennas in order to perform in multi-input, multi-output (MIMO) communications with less hardware than conventional implementations due to frequency sharing between the SDRs. In other aspects, SDRs in multiple access points can perform collaborative beamforming to cancel blockers from received signals so that less complex and less costly hardware can be used in transceivers of the access points.

Implementations disclosed herein present a fully programmable software defined radio (SDR) platform and system able to be implemented on general-purpose computing devices, including personal computer (PC) architectures. Implementations of the SDR herein combine the performance and fidelity of general-purpose processor (GPP) SDR platforms. In addition, implementations of the SDR herein may use both hardware and software components and techniques to perform the processes described herein.

FIG. 1 illustrates an exemplary architecture of an SDR platform and system 100 according to some implementations herein. The SDR platform and system 100 includes one or more processors 102 that may be multi-core processors according to some implementations. Each core 104 includes one or more corresponding onboard local caches 106 that are used by the corresponding 104 during processing. Additionally, the processor 102 may also include one or more shared caches 108 and a bus interface 110. Examples of suitable multi-core processors include the Xenon™ processor available from Intel Corporation of Santa Clara, Calif., USA, and the Phenom™ processor available from Advanced Micro Devices of Sunnyvale, Calif., USA, although implementations herein are not limited to any particular multi-core processor. In addition, the processor 102 may be reprogrammable hardware such as Field Programmable Gate Arrays (FPGA), or even dedicated hardware engines. In one example illustrated, one or more cores can be allocated for performing processing for the SDR, while other remaining cores can perform processing for other applications, the operating system, or the like. Further, in some implementations, two or more processors 102 can be provided, and cores 104 across the two or more processors 102 can be used for SDR processing. Throughout the disclosure, the processors 102 can interchangeably be referred to as processing circuitry or circuitry.

The processor 102 is in communication via bus interface 110 with a high-throughput, low-latency bus 112, and thereby to a system memory 114. The bus 112 may be a PCIe bus or other suitable bus having a high data throughput with low latency. Further, the bus 112 is also in communication with a radio controller 116. As is discussed fluffier below, the radio controller 116 may be coupled to an interchangeable radio front end (RF front end) 118. The RF front end 118 is a hardware module that receives and/or transmits radio signals through an antenna (not shown in FIG. 1). In some implementations of the SDR architecture herein, the RF front end 118 represents a well-defined interface between the digital and analog domains. For example, in some implementations, the RF front end 118 may include analog-to-digital (A/D) and digital-to-analog (D/A) converters, and necessary circuitry for radio frequency transmission, as is discussed further below.

During receiving, the RF front end 118 acquires an analog RF' waveform 120 from the antenna, possibly down-converts the waveform to a lower frequency, and then digitizes the analog waveform into discrete digital samples 122 before transferring the digital samples 122 to the radio controller 116. During transmitting, the RF front end 118 accepts a stream of software-generated digital samples 122 from a software radio stack 124 (i.e., software that generates the digital samples, as discussed below), and synthesizes the corresponding analog waveform 120 before emitting the waveform 120 via the antenna. Since all signal processing is done in software on the processor 102, the design of RF front end 118 can be rather generic. For example, the RF front end 118 can be implemented in a self-contained module with a standard interface to the radio controller 116. Multiple wireless technologies defined on the same frequency band can use the same RF front end hardware 118. Furthermore, various different RF front ends 118 designed for different frequency bands can be coupled to radio controller 116 for enabling radio communication on various different frequency bands. Therefore, implementations herein are not limited to any particular frequency or wireless technology.

According to some implementations herein, the radio controller 116 is a PC interface board optimized for establishing a high-throughput, low-latency path for transferring high-fidelity digital signals between the RF front end 118 and memory 114. The interfaces and connections between the radio front end 118 and multi-core processor 102 can enable sufficiently high throughput to transfer high-fidelity digital waveforms. Accordingly, to achieve a predetermined system throughput, some implementations of the radio controller 116 use a high-speed, low-latency bus 112, such as PCIe. With a maximum throughput of 64 Gbps (e.g., PCIe x32) and sub-microsecond latency, PCIe is easily able to support multiple gigabit data rates for sending and receiving wireless signals over a very wide band or over many MIMO channels. Further, the PCIe interface is typically common in many conventional general-purpose computing devices. The radio controller 116 can also be a dedicated hardware bus connection, and may even be co-located with the processor 102 and the RF front end 118.

One role of the radio controller 116 is to act as a bridge between the synchronous data transmission at the RF front end 118 and the asynchronous processing on the processor 102, The radio controller 116 implements various buffers and queues, together with a large onboard memory, to convert between synchronous and asynchronous streams and to smooth out bursty transfers between the radio controller 116 and the system memory 114. The large onboard memory further allows caching of pre-computed waveforms for quick transmission of the waveforms, such as when acknowledging reception of a transmission, thereby adding additional flexibility for software radio processing.

In addition, the radio controller 116 provides a low-latency control path for software to control the RF front end hardware 118 and to ensure that the RF front end 118 is properly synchronized with the processor 102. For example, wireless protocols have multiple real-time deadlines. Consequently, not only is processing throughput a critical requirement, but the processing latency should also meet certain response deadlines. For example, some Media Access Control (MAC) protocols also require precise timing control at the granularity of microseconds to ensure certain actions occur at exactly pre-scheduled time points. The radio controller 116 of implementations herein also provides for such low latency control.

Figure 2:
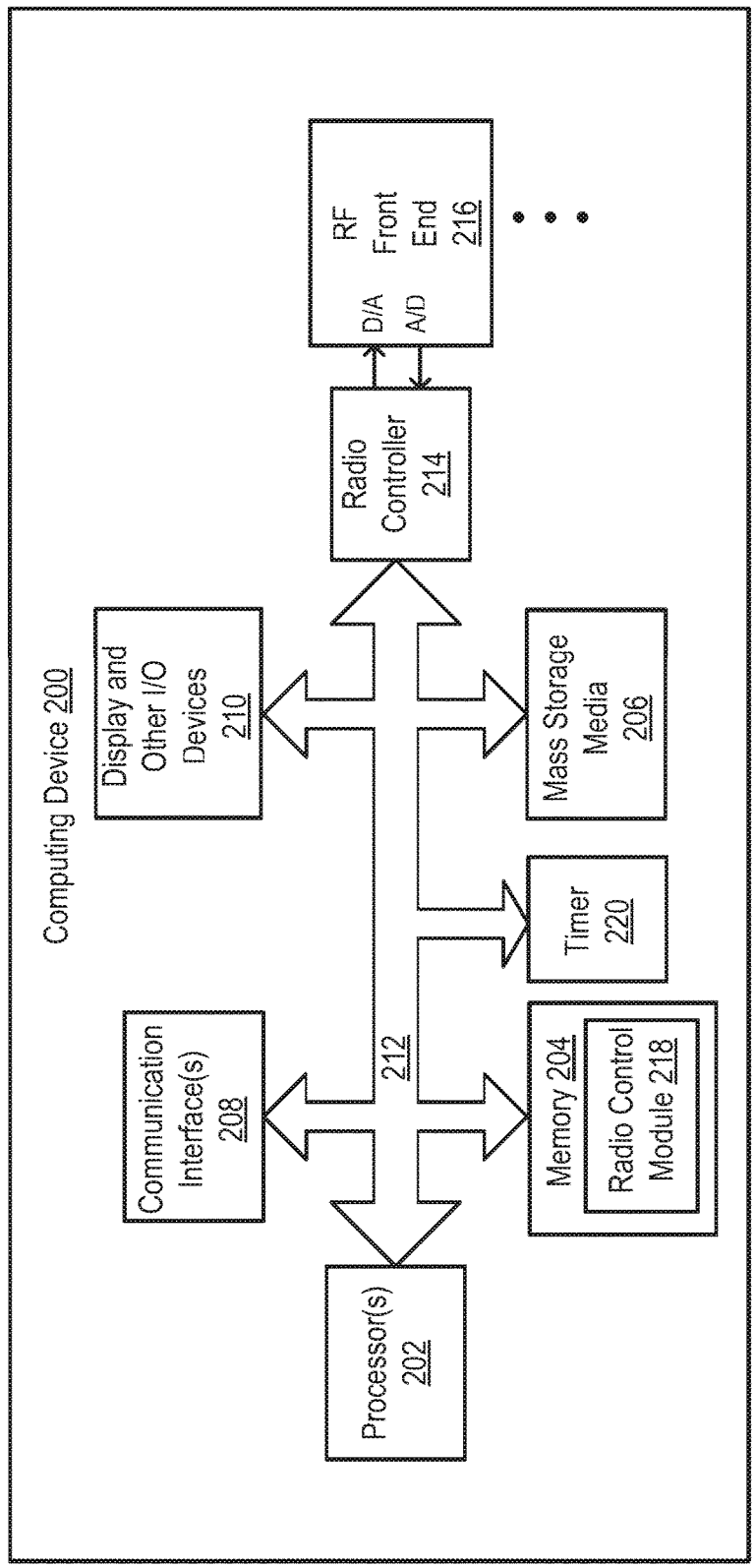
FIG. 2 is an exemplary diagram of a hardware and logic configuration of a computing device, according to certain embodiments.

FIG. 2 illustrates an exemplary depiction of a computing device 200 that can be used to implement the SDR implementations described herein, such as the SDR platform and system 100 described above with reference to FIG. 1. In the implementations described further herein, the computing device 200 may be a wireless access point or mobile device that can implement one or more wireless communication protocols, such as a base station, switch, router, user equipment (UE), and the like. In addition, the terms computing device and SDR can be used interchangeably throughout the disclosure.

The computing device 200 includes one or more processors 202, a memory 204, one or more mass storage devices or media 206, communication interfaces 208, and a display and other input/output (I/O) devices 210 in communication via a system bus 212. In addition, the computing device 200 can also include one or more timer blocks 220 in order to provide a notion of time to the various components of the computing device 200. Memory 204 and mass storage media 206 are examples of computer-readable storage media able to store instructions which cause computing device 200 to perform the various functions described herein when executed by the processor(s) 202. For example, memory 204 may generally include both volatile memory and non-volatile memory (e.g., RAM, ROM, or the like). Further, mass storage media 206 may generally include hard disk drives, solid-state drives, removable media, including external and removable drives, memory cards, Flash memory, or the like. The computing device 200 can also include one or more communication interfaces 208 for exchanging data with other devices, such as via a network, direct connection, or the like, as discussed above. The display and other input/output devices 210 can include a specific output device for displaying information, such as a display, and various other devices that receive various inputs from a user and provide various outputs to the user, and can include, for example, a keyboard, a mouse, audio input/output devices, a printer, and so forth.

Computing device 200 further includes radio controller 214 and RF front end 216 for implementing the SDR herein. For example, system bus 212 may be a PCIe compatible bus, or other suitable high throughput, low latency bus. The radio controller 214 and the RF front end 216 may correspond to the radio controller 116 and the RF front end 118 described previously with reference to FIG. 2, and as also described below, such as with reference to FIG. 3. Furthermore, a radio control module 218 can include software instructions stored in memory 204 or other computer-readable storage media for controlling operations on radio controller 214, as is described additionally below. The computing device 200 described herein s only one example of a computing environment and is not intended to suggest any limitation as to the scope of use or functionality of the computer architectures that can implement the SDR herein. Neither should the computing device 200 be interpreted as having any dependency or requirement relating to any one or combination of components illustrated in the computing device 200.

Furthermore, implementations of SDR platform and system 100 described above can be employed in many different computing environments and devices for enabling a software-defined radio in addition to the example of computing device 200 illustrated in FIG. 2. Generally, many of the functions described with reference to the figures can be implemented using software, hardware (e.g., fixed logic circuitry), manual processing, or a combination of these implementations. The term "logic", "module" or "functionality" as used herein generally represents software, hardware, or a combination of software and hardware that can be configured to implement prescribed functions. For instance, in the case of a software implementation, the term "logic," "module," or "functionality" can represent program code (and/or declarative-type instructions) that perform specified tasks when executed on a processing device or devices (e.g., CPUs or processors). The program code can be stored in one or more computer readable memory devices, such as memory 204 and/or mass storage media 206, or other computer readable storage media. Thus, the methods and modules described herein may be implemented by a computer program product. The computer program product may include computer-readable media having a computer-readable program code embodied therein. The computer-readable program code may be adapted to be executed by one or more processors to implement the methods and/or modules of the implementations described herein. The terms "computer-readable storage media", "processor-accessible storage media", or the like, refer to any kind of machine storage medium for retaining information, including the various kinds of memory and storage devices discussed above.

Figure 3:
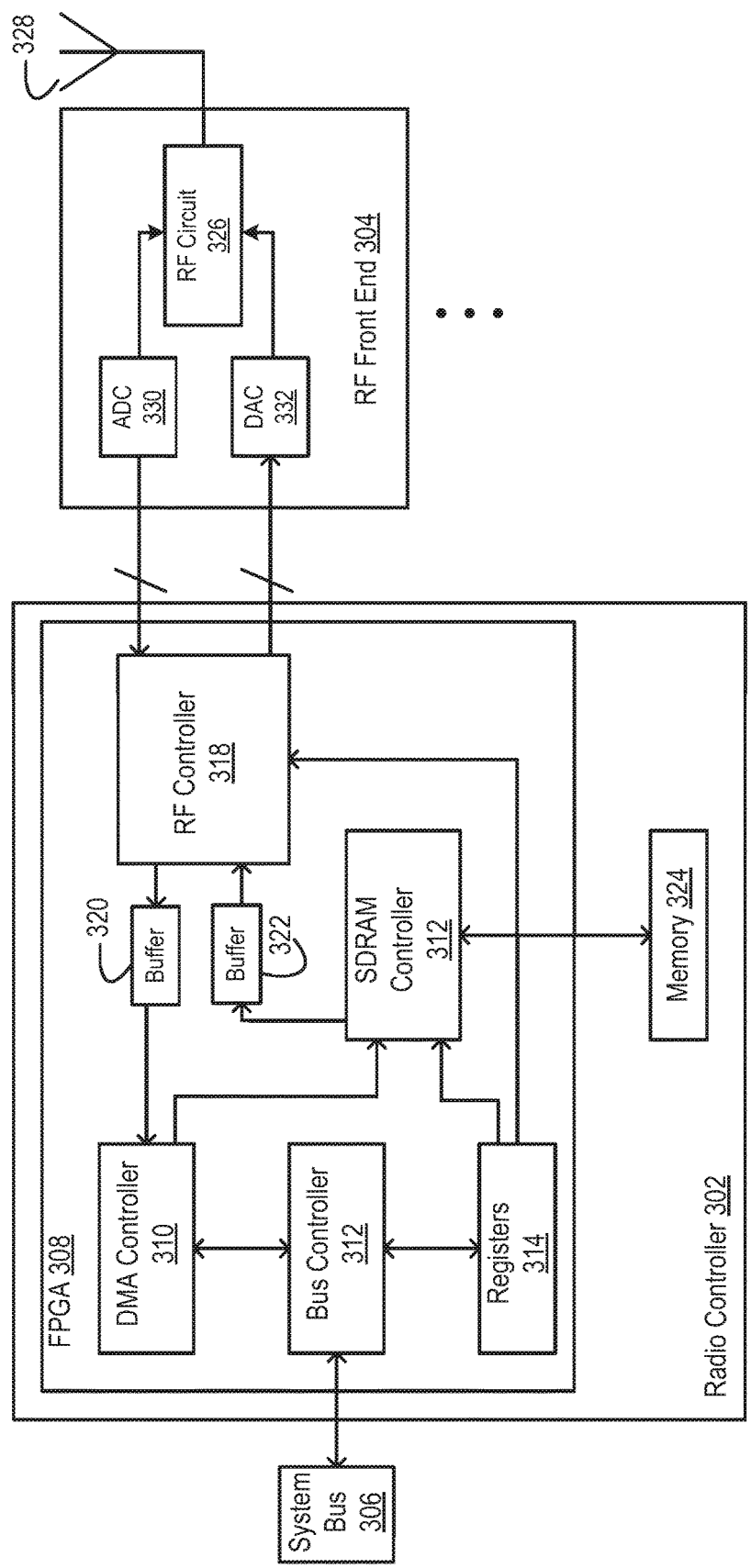
FIG. 3 is an exemplary diagram of a radio controller and a RF front end, according to certain embodiments.

FIG. 3 illustrates an exemplary implementation of a radio controller 302 and RF front end 304 that may correspond to the radio controller 116, 214 and RF front end 118, 216 described previously. In the example illustrated, the radio controller 302 includes functionality for controlling the transfer of data between the RF front end 304 and a system bus 306, such as buses 112, 212 discussed previously. In the illustrated implementation, the functionality is a field-programmable gate array (FPGA) 308, which may be a Virtex-5 FPGA available from Xilinx, Inc., of San Jose, Calif., USA, one or more other suitable FPGAs, or other equivalent circuitry configured to accomplish the functions described herein. The radio controller 302 includes a direct memory access (DMA) controller 310, a bus controller 312, registers 314, an SDRAM controller 316, and an RF controller 318. The radio controller 302 further includes a first FIFO buffer 320 for acting as a first FIFO for temporarily storing digital samples received from RF front end 304, and a second FIFO buffer 322 for temporarily storing digital samples to be transferred to RF front end 304. The DMA controller 310 controls the transfer of received digital samples to the system bus 306 via the bus controller 312. SDRAM controller 316 controls the storage of data in onboard memory 324, such as digital samples, pre-generated waveforms, and the like.

The radio controller 302 can connect to various different RF front ends 304. In some implementations, the RF front end 304 includes an RF circuit 326 configured as an RF transceiver for receiving radio waveforms from an antenna 328 and for transmitting radio waveforms via antenna 328. The RF front end 304 further may include an analog-to-digital converter (ADC) 330 and a digital-to-analog converter (DAC) 332. As discussed previously, analog-to-digital converter 330 converts received radio waveforms to digital samples for processing, while digital-to-analog converter 332 converts digital samples generated by the processor to radio waveforms for transmission by RF circuit 326. Furthermore, it should be noted that implementations herein are not limited to any particular front end 304, and in some implementations, the entire front end 304 may be incorporated into the radio controller 302. Alternatively, in other implementations, analog-to-digital converter 330 and digital-to-analog converter 332 may be incorporated into the radio controller 302, and RF front end 304 may merely have an RF circuit 326 and antenna 328. Other variations may also be apparent in view of the disclosure herein.

In the implementation illustrated in FIG. 3, the DMA controller 310 and bus controller 312 interface with the memory and processor on the computing device (not shown in FIG. 3) and transfer digital samples between the radio controller 302 and the system memory on the computing device, such as memory 114, 204 discussed above. The radio controller software control module 218 discussed above with reference to FIG. 2 sends commands and reads radio controller states through radio controller registers 314. The radio controller 302 further uses onboard memory 324 as well as small FIFO buffers 320, 322 on the FPGA 308 to bridge data streams between the processor on the computing device and the RF front end 304. When receiving radio waveforms, digital signal samples are buffered in on-chip FIFO buffer 320 and delivered into the system memory on the computing device when the digital samples fit in a DMA burst (e.g., 128 bytes). When transmitting radio waveforms, the large radio controller memory 324 enables implementations of the radio controller manager module 218 (e.g., FIG. 2) to first write the generated samples onto the radio controller memory 324, and then trigger transmission with another command to the radio controller 302. This functionality provides flexibility to the implementations of the SDR manager module 218 for pre-calculating and storing of digital samples corresponding to several waveforms before actually transmitting the waveforms, while allowing precise control of the timing of the waveform transmission.

Aspects of the present disclosure described further herein are directed to collaborative operations of software defined radios (SDRs) for purposes of improving wireless communications between access points (APs) and stations, such as UEs, base stations, and the like. In some implementations, such as in the case of UEs that are mobile electronic devices, such as laptops, tablets, or cell phones, the stations may be continuously moving to new positions with respect to stationary access points for the wireless communication networks. In conventional implementations, the UEs perform handoff procedures with the access points to maintain communications, but performing the handoff procedures can take up processing resources from the UE that could be used for other purposes, and any errors that occur in the handoff procedures can result in dropped network connections. Implementing SDRs in the access points of wireless communications networks allows the access points to broadcast PHY protocols for multiple transmission protocols as well as perform virtual handoff procedures between the access points that allow the UEs to transition between multiple access point connections without performing handoff procedures.

For example, in SDR implementations, functionality of some radio components is achieved through execution of one or more software processes by the processing circuitry of the processor 202 rather than through dedicated hardware components, which can be referred to as software defined components. For example, the filter components, and digital signal processor may be software defined components of the SDR. In addition, some of the components of the RF front end 216 can also be executed as software defined components and/or are configured by the software defined components. For example, the configuration of the ADCs of the receiver can be modified by control signals issued by the processing circuitry.

Figure 4:
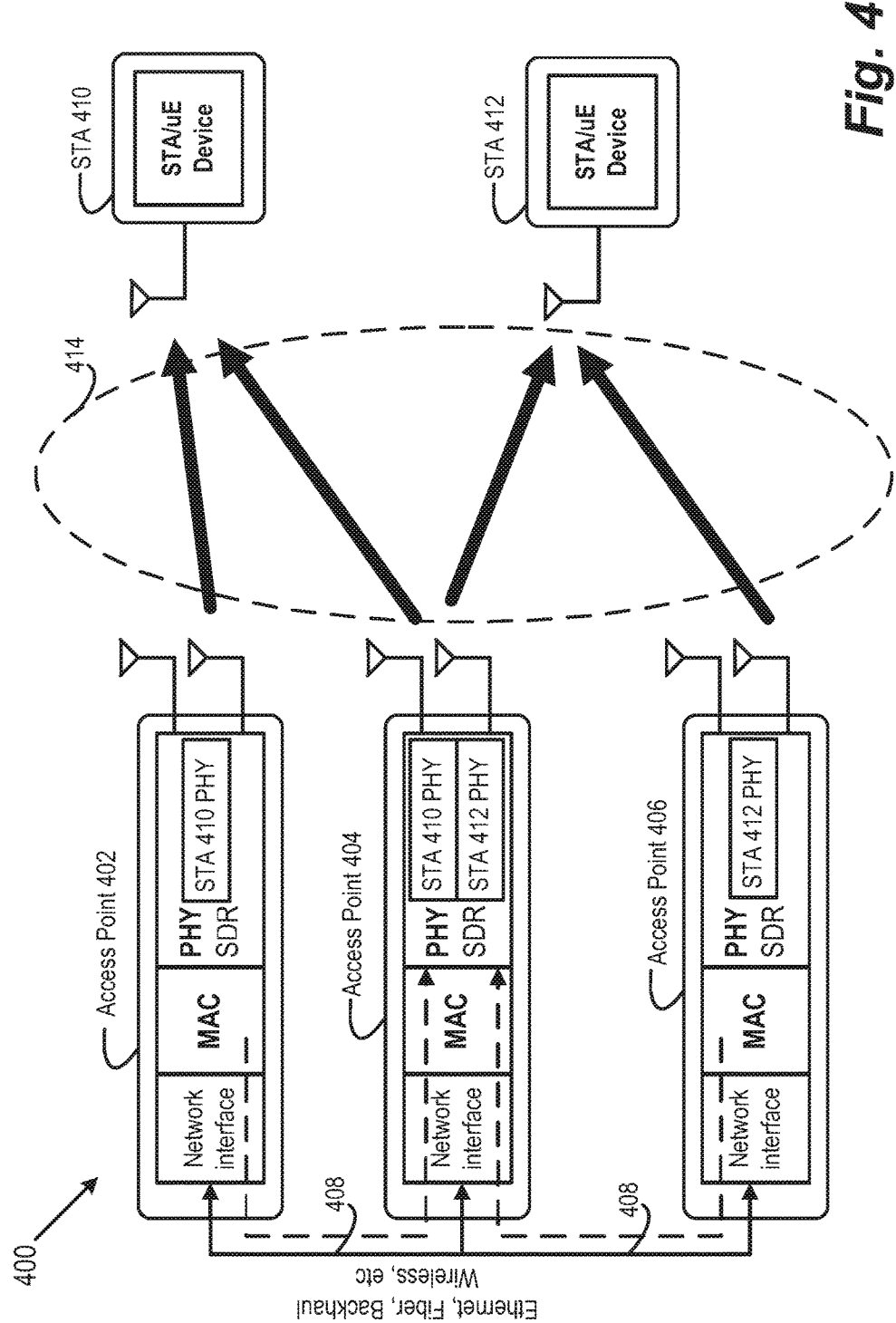
FIG. 4 is an exemplary diagram of a wireless communication system, according to certain embodiments.

FIG. 4 is an exemplary diagram of a wireless communication system 400, according to certain embodiments. The wireless communication system includes access points (APs) 402, 404, and 406 which conduct wireless data transmissions with stations 410 and 412. The access points 402, 404, and 406 can represent any hardware device that allow wireless devices to connect to a wired or wireless network via a communications protocol, such as any of the IEEE 802.11 standards, 3GPP Long Term Evolution (LIE), LTE-Advanced (LTE-A), and any other wireless network standard. The access points may be included as circuitry associated with a base station, switch, router, user equipment (UE), and the like.

In some implementations, the access points 402, 404, and 406 include one or more network layers, such as a network interface layer, media access control (MAC) layer, and physical (PHY) layer. The access points 402, 404, and 406 can be connected to each other at the network interface layers via a backhaul network 408 that can be implemented as an ETHERNET, fiber, backhaul wireless, or any other type of network infrastructure. The access points 402, 404, and 406 can transfer replica PHY protocol data, MAC personality data, or any other type of data related to collaborative operations via the backhaul network 408. The PHY layer of each of the access points 402, 404, and 406 includes a SDR, which is an implementation of the computing device 200. Like the computing device 200, the SDRs of the access points 402, 404, and 406 include processing circuitry to perform the methods described further herein. The SDRs within the PHY layers allow the access points 402, 404, and 406 to simultaneously implement multiple communications protocols corresponding to the stations 410 and 412. From the perspective of the stations 410 and 412, each of the access points 402, 404, and 406 can appear to be multiple access points or devices.

The stations 410 and 412 represent any hardware device that can wirelessly communicate with the access points 402, 404, and 406 via one or more wireless communications protocols 414 and can include base stations or UEs such as mobile electronic devices, laptops, tablets, or cell phones.

The wireless communication system 400 illustrated in FIG. 4 is just one implementation, and other implementations can include any number of access points and/or stations based on system infrastructure, capacity, or station density.

In one implementation, the access point 402 implements a MAC/PHY communication protocol that corresponds to a communications protocol for the station 410. Likewise, the access point 406 implements a MAC/PHY communication protocol that corresponds to a communications protocol for the station 412. When the access point 402 detects another access point that is also able to communicate with the station 410 based on predetermined connection criteria, the MAC layer of the access point 402 can transfer replicated PHY protocol signals for the station 410 to the access point 404 via the backhaul network 408. Once the replicated PHY protocol signal is received, the access point 404 can function as an identical access point to access point 402 by implementing the replicated PHY protocol so that the station 410 does not have to perform handoff procedures between the access points 402 and 404. Therefore, the replicated protocol transfer achieved between access points 402 and 404 can be performed so that the station 410 is unaware that there has been a change in the physical access point. Stated another way, the access points 402 or 404 can communicate with the station 410 via a replicated PHY protocol with unmodified communications parameters resulting in a physical access point shift that is transparent to the station 410.

In addition, when the access point 404 connects to the station 410, the access point 404 sends a connection confirmation message to the access point 402. Receiving the connection confirmation message from the access point 404 provides an indication to the access point 402 that another access point has established a communication link with the station 410. Likewise, the access point 406 that is in communication with the station 412 can also transfer a replicated PHY protocol signal to the access point 404 so that the access point 404 can operate as an access point for both the station 410 and the station 412.

The predetermined connection criteria used to identify the access points to transfer the PHY protocol signals to can include a combination of performance-based and non-performance-based criteria. For example, performance-based criteria can include thresholds associated with signal strength such as received signal strength indicator (RSSI), time of arrival, GPS coordinates, motion prediction, and the like. Non-performance criteria can include load balancing between the APs. For example, if a signal strength for a signal received by the access point 404 from the station 410 greater than a predetermined connection threshold or a motion prediction path indicates that the station 410 will be inside a predetermined range of the access point 404 for at least a predetermined period of time, the access point 402 can transfer the replicated PHY protocol signal for the station 410 to the access point 404 via the backhaul network 408.

In addition, if the access point 402 no longer meets one or more of the predetermined connection criteria for communicating with the station 410, the access point 402 can transfer an entire MAC personality to the access point 404 via the backhaul network 408, and the station 410 continues to operate as if the access point has not been modified. In addition, the access point 406 can also transfer a MAC personality to the access point 404 when the access point 406 no longer meets the predetermined connection criteria for communicating with the station 412. In addition, when the access point 404 implements the transferred MAC personality for the station 410, the access point 404 sends a MAC transfer confirmation message to the access point 402. Receiving the MAC transfer confirmation message from the access point 404 provides an indication to the access point 402 that the access point 404 has implemented the MAC personality for station 410. In some implementations, when the MAC personalities have been transferred from the access points 402 and/or 406 to the access point 404, the access points 402 and/or 406 can continue to implement the replicated PHY protocols for the stations 410 and/or 412 until the access points 402 and/or 406 are unable to assist the access point 404 in communicating with the stations 410 and/or 412.

The access points 402 and/or 406 may terminate communications with the stations 410 and/or 412 when one or more predetermined disconnection criteria are met and the access points 402 and/or 406 have received the MAC transfer confirmation message from the access point 404 indicating that the MAC personality for the stations 410 and/or 412 have been implemented at the access point 404. The predetermined disconnection criteria may also include thresholds associated with a combination of performance-based and non-performance-based criteria such as RSSI, time of arrival, GPS coordinates, motion prediction, load balancing, and the like. In some implementations, threshold values for the predetermined disconnection criteria may be equal to the threshold values for the predetermined connection criteria. However, in other implementations, the threshold values for the predetermined disconnection criteria may be greater than or less than the threshold values for the predetermined connection criteria.

For example, a signal strength connection threshold may be greater than a signal strength disconnection threshold so that the access points 402 and/or 404 transfer the MAC personalities to the access point 404 when the signal strength with the stations 410 and/or 412 fall below the signal strength connection threshold but continues to transmit the replicated PHY protocol for the stations 410 and/or 412 until the signal strength falls below the signal strength disconnection threshold. As the stations 401 and/or 412 move through the wireless communication network 400, the replica PHY protocols and/or MAC personalities are transferred between the access points 402, 404, and 406 so that the stations 410 and 412 remain connected to at least one of the access points 402, 404, and 406 without having to perform handoff procedures and without being aware that the physical access point has been modified.

Figure 5:
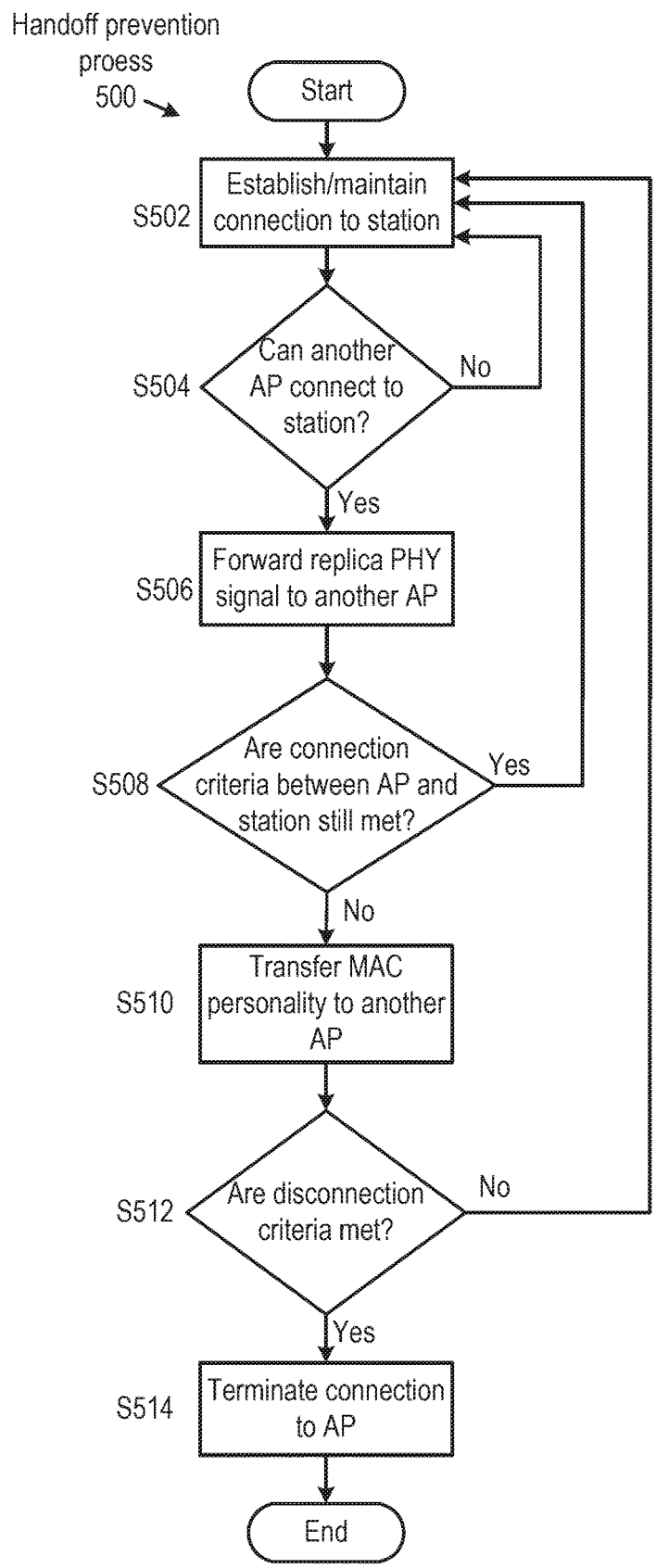
FIG. 5 is an exemplary flowchart of a handoff prevention process, according to certain embodiments.

FIG. 5 is an exemplary flowchart of a handoff prevention process 500, according to certain embodiments. The handoff prevention process 500 is described herein with respect to the wireless communication system 400 but can also be implemented in any wireless communication system with access points that have SDRs in the PHY layers that are able to represent multiple PHY protocols that correspond to the communication protocols of one or more stations within communication distance of the access points. In addition, the handoff prevention process 500 is described with respect to interactions between the access points 402 and 404 and the station 410 but can also be applied to the interactions between the access points 404 and 406 and the station 412.

At step S502, one or more of the access points 402, 404, and 406 establish or maintain a connection to a device, such as the station 410 or station 412 via a PHY communications protocol that corresponds to the station 410. For example, the access point 402 implements a MAC/PHY communication protocol that corresponds to a communications protocol for the station 410. Likewise, the access point 406 implements a MAC/PHY communication protocol that corresponds to a communications protocol for the station 412. In certain embodiments, the PHY communications protocol can include protocols associated with any of the IEEE 802.11 standards, 3GPP Long Term Evolution (LIE), LTE-Advanced (LTE-A) or any other wireless network standard. The SDRs within the PHY layer of the access points 402, 404, and 406 can implement more than one PHY communications protocol in order to communicate simultaneously with more than one station via more than one communications protocol.

At step S504, the processing circuitry of the SDR within the access point 402 determines whether another access point can connect to the station 410. The access point 402 detects another access point that is also able to communicate with the station 410 based on predetermined connection criteria. The predetermined connection criteria used to identify the access points to transfer the PHY protocol signals to can include a combination of performance-based and non-performance-based criteria. For example, performance-based criteria can include thresholds associated with signal strength such as received signal strength indicator (RSSI), time of arrival, GPS coordinates, motion prediction, and the like. Non-performance criteria can include load balancing between the APs. For example, the processing circuitry of the SDR may determine that one or more predetermined connection criteria are met when a signal strength for a signal received by the access point 404 from the station 410 is greater than a predetermined connection threshold or a motion prediction path indicates that the station 410 will be inside a predetermined range of the access point 404 for at least a predetermined period of time. If the processing circuitry determines that another access point can connect to the station 410 based on the predetermined connection criteria, resulting in a "yes" at step S504, then step S506 is performed. Otherwise, if it is determined that another access point is unable to connect to the station 410, resulting in a "no" at step S504, then the process returns to step S502.

If it is determined at step S504 that another access point can connect to the station 410, then at step S506, the access point 402 forwards a replica PHY signal to the other access point that is able to connect to the station 410 via backhaul network 408, which is the access point 404 according to one implementation. In some implementations, the MAC layer of the access point 402 can transfer replicated PHY protocol signals for the station 410 to the access point 404 via the backhaul network 408. Once the replicated PHY protocol signal is received, the access point 404 can function as an identical access point to access point 402 by implementing the replicated PHY protocol so that the station 410 does not have to perform handoff procedures between the access points 402 and 404 and is unaware that the physical access point has been transferred. In addition, when the access point 404 connects to the station 410, the access point 404 sends a connection confirmation message to the access point 402. Receiving the connection confirmation message from the access point 404 provides an indication to the access point 402 that another access point has established a communication link with the station 410.

At step S508, it is determined whether one or more of the predetermined connection criteria between the access point 402 and the station 410 are still met. If it is determined that one or more of the predetermined connection criteria are still met, resulting in a "yes" at step S508, then the process returns to step S502, and the access point 402 maintains connection with the station 410. Otherwise, if it is determined that t one or more of the predetermined connection criteria are not met, resulting in a "no" at step S508, then step S510 is performed. In some implementations, step S510 is performed if all of the predetermined connection criteria are not met, but in other implementations, step S510 is performed if just one or more of the predetermined connection criteria are not met.

If it is determined at step S508 that the access point 402 is unable to maintain connection with the station 410, then at step S510, the access point 402 transfers the MAC personality for the PHY protocol associated with the station 410 to the access point 404. When the MAC personality is transferred to the access point 404 via the backhaul network 408, the station 410 continues to operate as if the access point had not been modified. In addition, when the access point 404 implements the transferred MAC personality for the station 410, the access point 404 sends a MAC transfer confirmation message to the access point 402. Receiving the MAC transfer confirmation message from the access point 404 provides an indication to the access point 402 that the access point 404 has implemented the MAC personality for station 410. In some implementations, when the MAC personalities have been transferred from the access point 402 to the access point 404, the access point 402 can continue to implement the replicated PHY protocols for the stations 410 and/or 412 until the access points 402 and/or 406 are unable to assist the access point 404 in communicating with the stations 410 and/or 412.

At step S512, it is determined whether one or more predetermined disconnection criteria between the access point 402 and the station 410 are met. The predetermined disconnection criteria may also include thresholds associated with a combination of performance-based and non-performance-based criteria such as RSSI, time of arrival, GPS coordinates, motion prediction, load balancing, and the like. In some implementations, threshold values for the predetermined disconnection criteria may be equal to the threshold values for the predetermined connection criteria. However, in other implementations, the threshold values for the predetermined disconnection criteria nay be greater than or less than the threshold values for the predetermined connection criteria.

For example, a signal strength connection threshold may be greater than a signal strength disconnection threshold so that the access points 402 and/or 404 transfer the MAC personalities to the access point 404 when the signal strength with the stations 410 and/or 412 fall below the signal strength connection threshold but continues to transmit the replicated PHY protocol for the stations 410 and/or 412 until the signal strength falls below the signal strength disconnection threshold. As the stations 401 and/or 412 move through the wireless communication network 400, the replica PHY protocols and/or MAC personalities are transferred between the access points 402, 404, and 406 so that the stations 410 and 412 remain connected to at least one of the access points 402, 404, and 406 without having to perform handoff procedures.

If it is determined that one or more of the predetermined disconnection criteria are met, resulting in a "yes" at step S512, then step S514 is performed. In some implementations, step S514 is performed if all of the predetermined disconnection criteria are met, but in other implementations, step S514 is performed if just one or more of the predetermined disconnection criteria are not met. Otherwise, if it is determined that t one or more of the predetermined disconnection criteria are not met, resulting in a "no" at step S512, then the process returns to step S502, and the access point 402 maintains connection with the station 410.

At step S514, the access point 402 may terminate communications with the station 410 when one or more of the predetermined disconnection criteria are met and the access points 402 have received the MAC transfer confirmation message from the access point 404 indicating that the MAC personality for the station 410 has been implemented at the access point 404.

Figure 6:
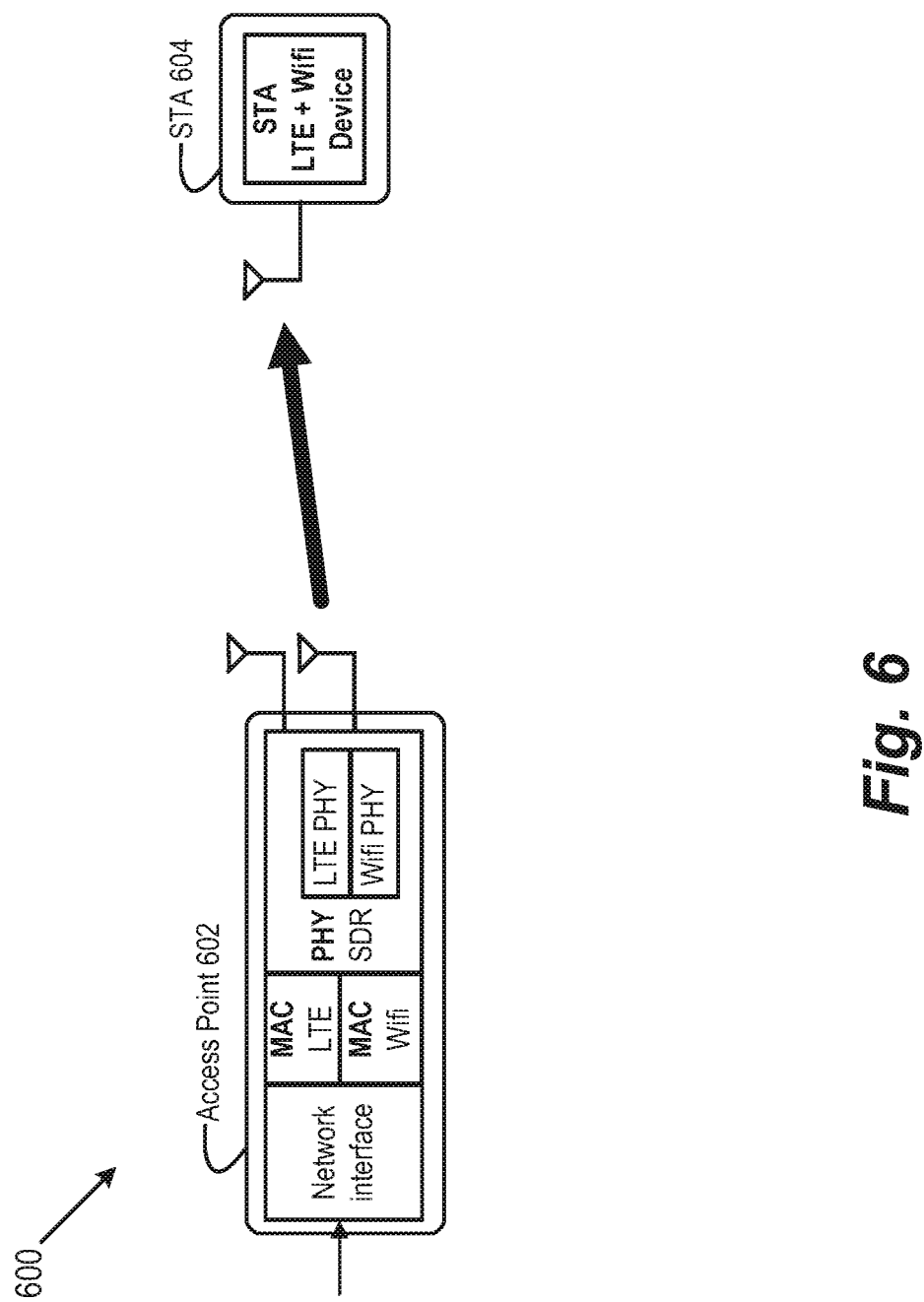
FIG. 6 is an exemplary diagram of a multi-protocol wireless communication system, according to certain embodiments.

FIG. 6 is an exemplary diagram of a multi-protocol wireless communication system 600, according to certain embodiments. The multi-protocol wireless communication system 600 includes an access point 602 and a station 604 and is one implementation of the wireless communication system 400. Like the access points 402, 404, and 406, the access point 602 can represent any hardware device that allow wireless devices to connect to a wired or wireless network via one or more communications protocols, such as any of the IEEE 802.11 standards, 3GPP Long Term Evolution (LTE), LTE-Advanced (LTE-A), and any other wireless network standard. In addition, the access points 602 includes one or more network layers, such as a network interface layer, MAC layer, and PHY layer. Because of the PHY layer that includes a SDR, the access point 602 can simultaneously implement different modem protocols associated with the station 604, such as a LTE PHY protocol and a WI-FI PHY protocol. The access point 602 also includes MAC personalities that correspond to each of the PHY protocols.

Simultaneously implementing multiple PHY protocols within the access point 602 allows the station 604 to seamlessly transition between the LTE connection and the WI-FI connection without performing any processes associated with disconnecting or connecting to access points that implement just one of the communications protocols. For example, if the station 604, is located outdoors, the station 604 may connect to the access point 602 via a LTE PHY protocol. As the station 604 moves inside a building, the access point 602 can make a transition to the WI-FI PHY protocol connection so that as the device moves further into the building where the LTE signal strength is weaker than outside the building, the station 602 remains connected to the access point 602 via the WI-FI PHY protocol.

Figure 7:
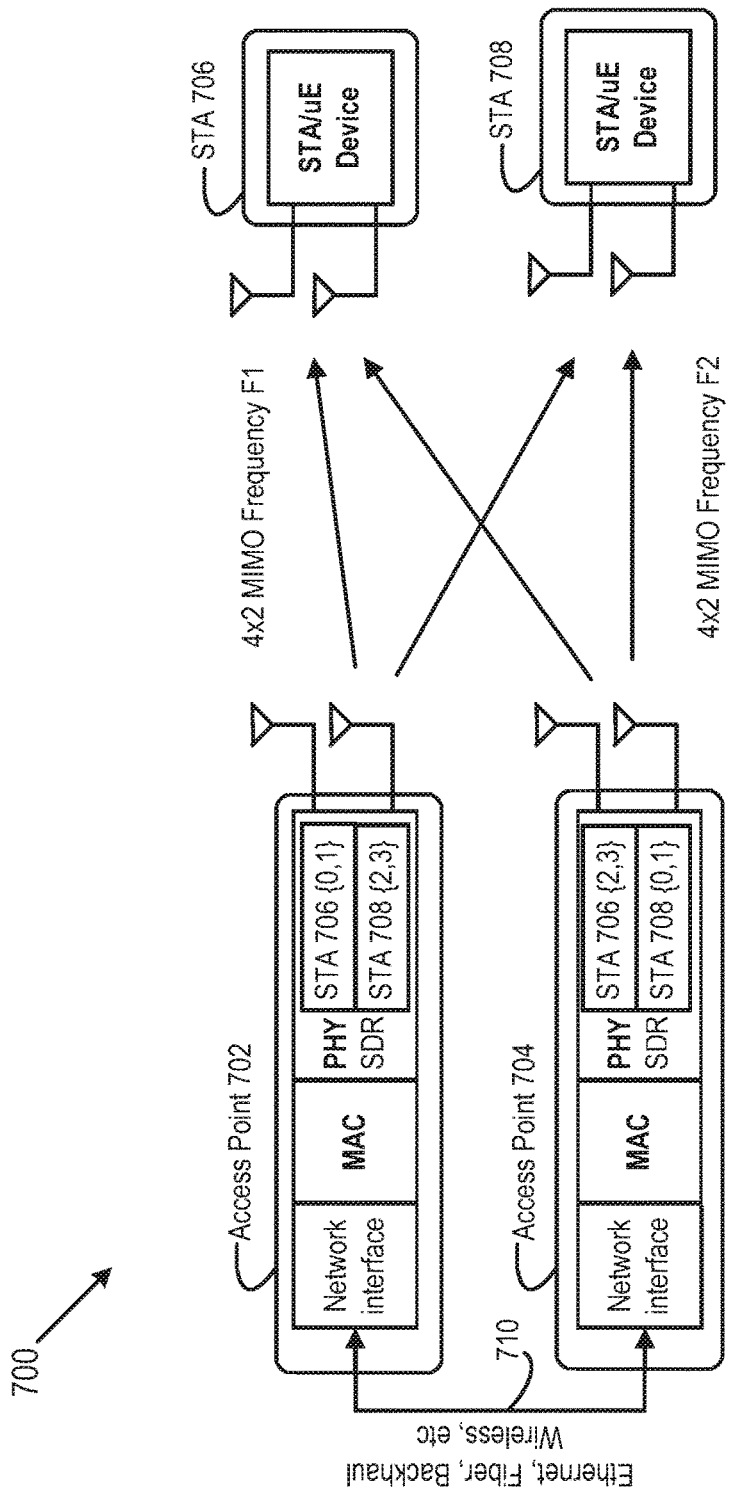
FIG. 7 is an exemplary diagram of a multi-input, multi-output (MIMO) wireless communication system, according to certain embodiments.

FIG. 7 is an exemplary diagram of a multi-input, multi-output (MIMO) wireless communication system 700, according to certain embodiments. The wireless communication system 700 includes access points (APs) 702 and 704 which conduct wireless data transmissions with stations 706 and 708. The access points 702 and 704 can represent any hardware device that allow wireless devices to connect to a wired or wireless network via a communications protocol, such as any of the IEEE 802.11 standards, 3GPP Long Term Evolution (LIE), LTE-Advanced (LTE-A), and any other wireless network standard. The access points 702 and 704 may be included as circuitry associated with a base station, switch, router, user equipment (UE), and the like. In some implementations, the access points 702 and 704 include one or more network layers, such as a network interface layer, media access control (MAC) layer, and physical (PHY) layer. The access points 702 and 704 can be connected to each other at the network interface layers via a backhaul network 710 that can be implemented as an ETHERNET, fiber, backhaul wireless, or any other type of network infrastructure.

The PHY layer of each of the access points 702 and 704 includes a SDR, which is an implementation of the computing device 200. Like the computing device 200, the SDRs of the access points 702 and 704 include processing circuitry to perform the methods described further herein. In addition, the front ends of the SDRs of each of the access points 704 and 704 have more than one antenna for conducting MIMO communications. For example, in the MIMO wireless communication system 700, the access points 702 and 704 have two antennas each that are used to form 4×2 MIMO channels to the stations 706 and 708 simultaneously. Locations of the access points 702 and 704 are separated by a distance of at least half a wavelength (λ/2) to provide for MIMO signal decorrelation at the stations 706 and 708. The SDRs within the PHY layers allow the access points 702 and 704 to modulate multiple frequencies at the same time in order to transmit MIMO signals to the stations 706 and 708 while achieving spatial diversity.

For example, the PHY at access point 702 modulates data on a frequency F1 to be transmitted to the station 706 via spatial streams {0,1}. The access point 702 also forwards coded data for the station 706, spatial streams {2,3} frequency F1 to the access point 704 via the backhaul network 710. The access point 704 then modulates the station 706 MEMO signal, spatial streams {2, 3} on frequency F1. In addition, the access point 702 applies a coding scheme to the spatial streams {0, 1, 2, 3} for the F1 MIMO signal transmitted prior to forwarding the spatial streams {2,3} to the access point 704, and the coded signals are decoded at receivers of the station 706.

Likewise, the PHY at access point 704 modulates data on a frequency F2 to be transmitted to the station 708 via spatial streams {0, 1}. The access point 704 also forwards coded data for the station 708, spatial streams {2, 3} frequency F2 to the access point 702 via the backhaul network 710. The access point 702 then modulates the station 708 MEMO signal, spatial streams {2, 3} on frequency F2. In addition, the access point 704 applies a coding scheme to the spatial streams {0, 1, 2, 3} for the F2 MIMO signal transmitted prior to forwarding the spatial streams {2, 3} to the access point 702, and the coded signals are decoded at receivers of the station 708. The access points 702 and 704 coordinate the transmission of the MIMO signals across the 4×2 MIMO channels to ensure that the stations 706 and 708 successfully receive the coded MIMO signals. In some implementations, the coordination of the MIMO signal transmission is performed based on predetermined timing specifications and/or by exchanging data messages via the backhaul network 710.

Figure 8:
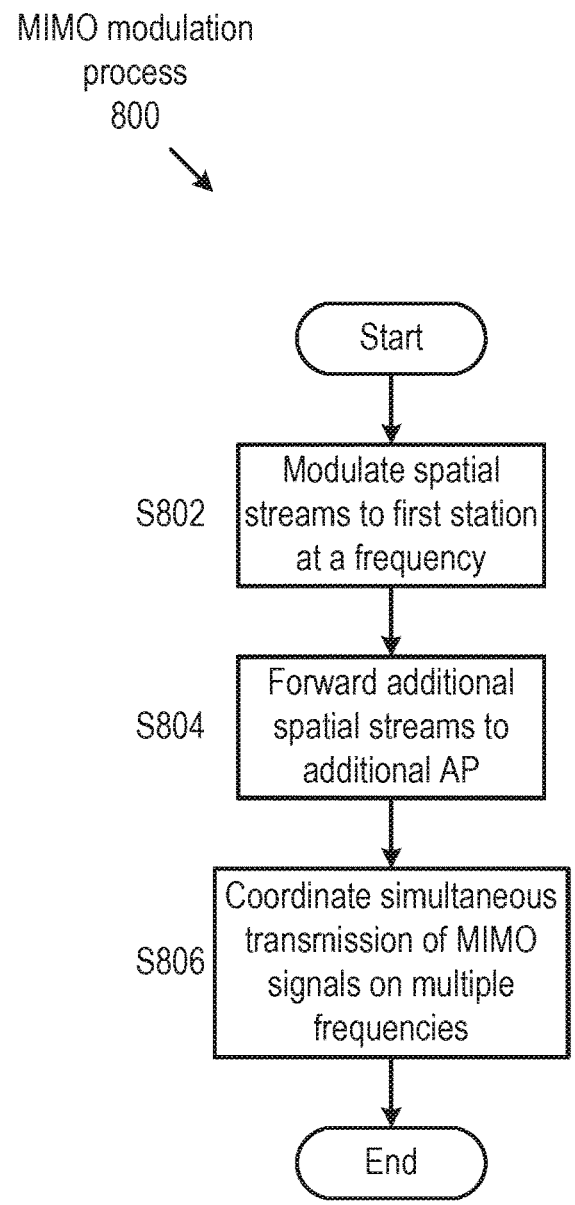
FIG. 8 is an exemplary flowchart of a MIMO modulation process, according to certain embodiments.

FIG. 8 is an exemplary flowchart of a MIMO modulation process 800, according to certain embodiments. The MIMO modulation process 800 is described herein with respect to the MEMO wireless communication system 700 but can also be implemented in any wireless communication system with access points that have SDRs with multiple antennas in the PHY layers that are able to modulate multiple frequencies simultaneously in order to transmit MIMO signals to multiple stations.

At step S802, the access points 702 and 704 modulate a first set of spatial streams at predetermined frequencies. In some implementations, the predetermined frequencies correspond to operational frequencies for the communications protocols, frequency band assignments for the stations and/or access points, and the like. For example, the access point 702 modulates spatial streams {0, 1} to station 706 at a frequency F1, and the access point 704 modulates spatial streams {0, 1} to station 708 at a frequency F2.

At step S804, the access points 702 and 704 forward data for additional spatial streams of the MIMO signal to the other access point 704 and 702 via the backhaul network 710 to provide spatial diversity for the MIMO transmission. The access point 702 forwards coded data for the station 706, spatial streams {2, 3} frequency F1 to the access point 704. The access point 704 then modulates the station 706 MIMO signal, spatial streams {2, 3} on frequency F1. In addition, the access point 702 applies a coding scheme to the spatial streams {0, 1, 2, 3} for the F1 MIMO signal transmitted prior to forwarding the spatial streams {2, 3} to the access point 704. Likewise, the access point 704 also forwards coded data for the station 708, spatial streams {2, 3} frequency F2 to the access point 702. The access point 702 then modulates the station 708 MIMO signal, spatial streams {2, 3} on frequency F2. In addition, the access point 704 applies a coding scheme to the spatial streams {0, 1, 2, 3} for the F2 MIMO signal transmitted prior to forwarding the spatial streams {2, 3} to the access point 702.

At step S806, the access points 702 and 704 coordinate simultaneous transmission of the MIMO spatial streams to the stations 706 and 708 on frequencies F1 and F2 to ensure that the stations 706 and 708 successfully receive the coded MIMO signals. In some implementations, the coordination of the MIMO signal transmission is performed based on predetermined timing specifications and/or by exchanging data messages via the backhaul network 710.

Figure 9:
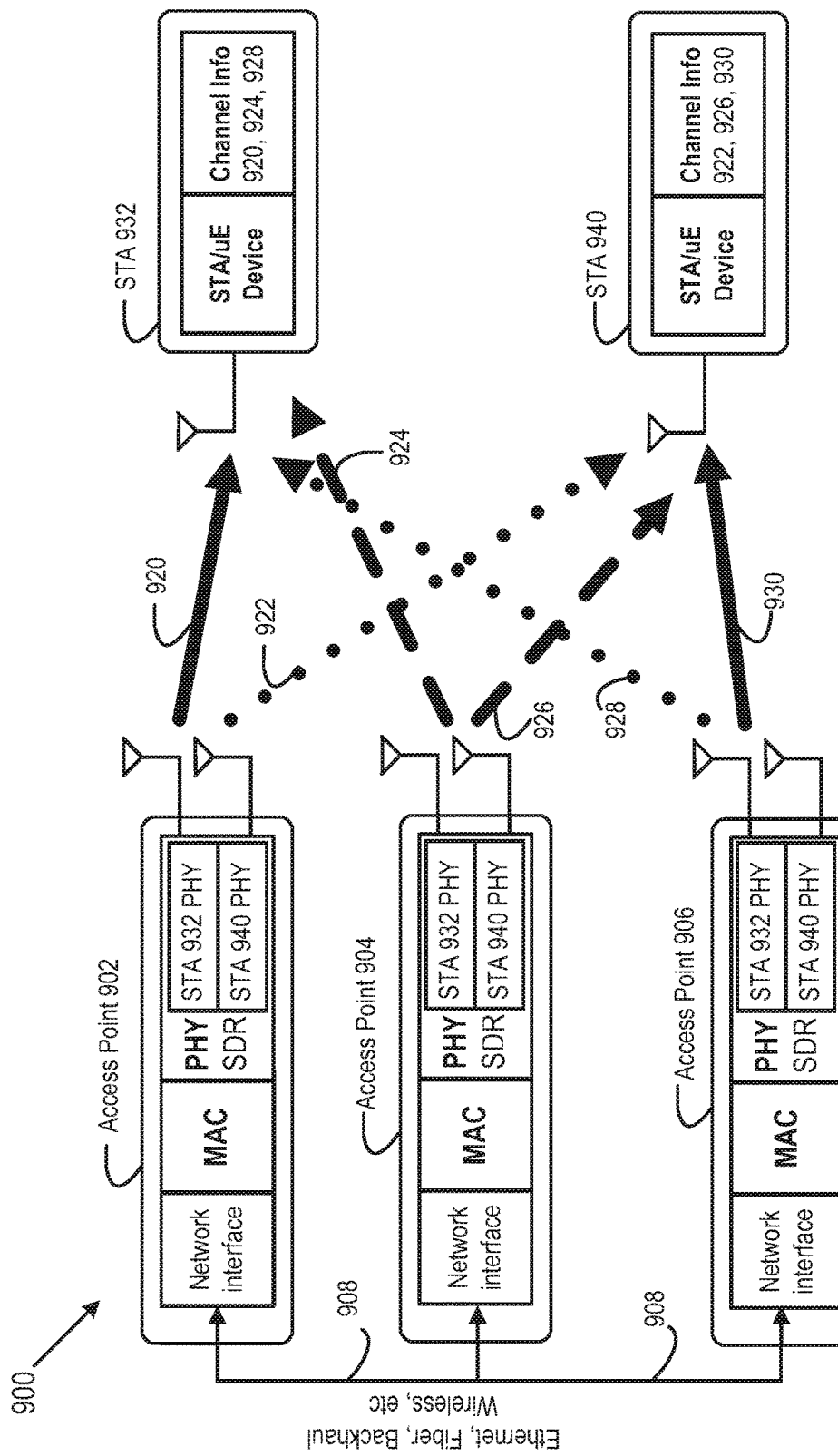
FIG. 9 is an exemplary diagram of a collaborative beamforming communication system, according to certain embodiments.

FIG. 9 is an exemplary diagram of a collaborative beamforming communication system 900, according to certain embodiments. The collaborative beamforming communication system 900 includes access points (APs) 902, 904, and 906 which can represent any hardware device that allow wireless devices to connect to a wired or wireless network via a communications protocol, such as any of the IEEE 802.11 standards, 3GPP Long Term Evolution (LTE), LIE-Advanced (LTE-A), and any other wireless network standard. The access points 902, 904, and 906 may be included as circuitry associated with a base station, switch, router, user equipment (UE), and the like, which conduct wireless data transmissions with stations 932 and 940. Also, the access points 902, 904, and 906 may be co-located or non-co-located. The collaborative beamforming communication system 900 illustrated in FIG. 9 is just one implementation, and other implementations can include any number of access points based on system infrastructure, capacity, or station density. In addition, the collaborative beamforming communication system 900 can perform any of the other processes discussed previously herein, such as the handoff prevention process 500 or the MIMO modulation process 800.

In some implementations, the access points 902, 904, and 906 include one or more network layers, such as a network interface layer, MAC layer, and PHY layer. The access points 902, 904, and 906 can be connected to each other at the network interface layers via a backhaul network 908 that can be implemented as an ETHERNET, fiber, backhaul wireless, OF any other type of network infrastructure. The access points 902, 904, and 906 can transfer collaboration data, synchronization data, blocker signal data, or any other type of data related to collaborative operations via the backhaul network 908. In some implementations, the collaboration data includes communication channel information for the stations 932 and 940. The PRY layer of each of the access points 902, 904, and 906 includes a SDR, which is an implementation of the computing device 200. Like the computing device 200, the SDRs of the access points 902, 904, and 906 include processing circuitry to perform the methods described further herein. The SDRs within the PHY layers allow the access points 902, 904, and 906 to adaptively respond to blocker signals that interfere with received signals by using collaborative beamforming to reduce interference from the blacker signals and increase the desired signal component by implementing SDRs in the access points 902, 904, and 906 that are agile enough to transmit and/or receive any type of signal associated with either of the stations 932 and 940.

When the access points 902, 904, and 906 communicate with the stations 932 and/or 940, interference signals can be produced, which interfere with signals received by other stations, which can produce signal distortions or masking of a desired signal. The interference signals can also be referred to as blockers or blocker signals. For example, the access point 902 transmits signal 920 to the station 932 which produces a corresponding interference (blocker) signal 922 that is received by the station 940, and the blocker signal 922 distorts desired signals, such as signal 930, that are received by the station 940. Likewise, when the signal 930 is transmitted by the access point 906 to the station 940, corresponding blocker signal 928 is produced which distorted desired signals, such as the signal 920, received by the station 932.

In some implementations, the access point 904 operates as a blocker cancellation device and performs collaborative beamforming based on knowledge of signals 920, 922, 928, and 930 along with side information to send cancellations signals 924 and 926 to the stations 932 and 940. For example, the purpose of the cancellation signals 924 and 926 is to cancel the interference associated with blocker signals 922 and 928. In addition, the cancellation signal paths 924 and 926 can be generated based on side information from the stations 932 and 940 to gain knowledge of signal paths from the access points 902, 904, and 906 to the stations 932 and 940. In other implementations, the access points 902 and 906 can also function as blocker cancellation devices. The SDRs in the PHY layer allow the access points to broadcast PHY protocols for multiple stations simultaneously so that one access point can simultaneously transmit blocker cancellation signals associated with multiple access points and/or stations.

In addition, the stations 932 and 940 can store channel information associated with each received signal. For example, the station 932 can store channel information associated with the signals 920, 924, and 928, and the station 940 can store channel information associated with the signals 922, 926, and 930. The channel information associated with the station 932 can be communicated through a reverse-link communication channel to one or more of the access points 902, 904, or 906 and can be communicated to the other access points 902, 904, or 906 via the backhaul network 908. In addition, the access points 902, 904, and 906 can perform reverse-link channel estimation based on transmissions from the stations 932 and/or 940 to the access points 902, 904, and 906. The access points 904 functioning as the blocker cancellation device can adaptively modify the blocker cancellation signals 924 and 926 based on the reverse-link channel information.

In one implementation, the access points 902, 904, and 906 can implement collaborative beamforming to perform non-causal cancellation with control channel, back channel information, and side channel information. In another implementation, the collaborative beamforming can be performed on-the-fly. The collaborative beamforming can also be used to perform non-causal digital cancellation blockers.

Figure 10:
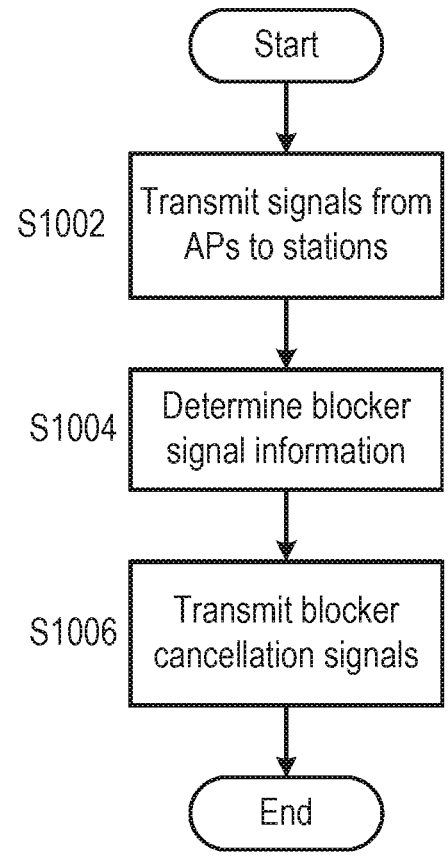
FIG. 10 is an exemplary flowchart of a collaborative beamforming process, according to certain embodiments.

FIG. 10 is an exemplary flowchart of a collaborative beamforming process 1000, according to certain embodiments. The collaborative beamforming process 1000 is described herein with respect to the collaborative beamforming communication system 900 but can also be implemented in any wireless communication system with access points that have SDRs that can adaptively respond to collaboratively cancel blockers in received signals by transmitting blocker cancellation signals.

At step S1002, one or more of the access points 902, 904, and 906 transmit signals to the stations 932 and/or 940. When the access points 902, 904, and 906 communicate with the stations 932 and/or 940, interference signals can be produced, which interfere with signals received by other stations, which can produce signal distortions or masking of a desired signal. The interference signals can also be referred to as blockers or blocker signals. For example, the access point 902 transmits signal 920 to the station 932 which produces a corresponding interference (blocker) signal 922 that is received by the station 940, and the blocker signal 922 distorts desired signals, such as signal 930, that are received by the station 940. Likewise, when the signal 930 is transmitted by the access point 906 to the station 940, corresponding blocker signal 928 is produced which distorted desired signals, such as the signal 920, received by the station 932.

At step S1004, the blocker signals 922 and 928 are detected by a blocker cancellation device, which is the access point 904 according to one implementation. The access point 904 also determines information associated with the transmitted signals 920 and 930 as well as the blocker signals 922 and 928 in order to generate blocker cancellation signals 924 and 926. In some implementations, the access point 904 can generate cancellation signal paths 924 and 926 based on side information from the stations 932 and 940 to gain knowledge of signal paths from the access points 902, 904, and 906 to the stations 932 and 940.

In addition, the stations 932 and 940 can store channel information associated with each received signal. For example, the station 932 can store channel information associated with the signals 920, 924, and 928, and the station 940 can store channel information associated with the signals 922, 926, and 930. The channel information associated with the station 932 can be communicated through a reverse-link communication channel to one or more of the access points 902, 904, or 906 and can be communicated to the other access points 902, 904, or 906 via the backhaul network 908. In addition, the access point 904 can perform reverse-link channel estimation based on received transmissions from the stations 932 and/or 940 to the access points 902, 904, and 906. The access points 904 functioning as the blocker cancellation device can adaptively modify the blocker cancellation signals 924 and 926 based on the reverse-link channel information.

At step S1006, the access point 904 transmits the blocker cancellation signals 924 and 926 to the stations 932 and 940, respectively. The access point 904 performs collaborative beamforming based on knowledge of signals 920, 922, 928, and 930 determined at step S1004 along with side information to send the cancellations signals 924 and 926 to the stations 932 and 940. In other implementations, the access points 902 and 906 can also function as blocker cancellation devices. The SDRs in the PHY layer allow the access points to broadcast PHY protocols for multiple stations simultaneously so that one access point can simultaneously transmit blocker cancellation signals associated with multiple access points and/or stations.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. Additionally, an implementation may be performed on modules or hardware not identical to those described. Accordingly, other implementations are within the scope that may be claimed.

The invention claimed is:

1. An access point comprising:
circuitry configured to
implement one or more PHY communications protocols to simultaneously communicate with one or more stations via communication links on one or more wireless networks;
communicate with additional access points via a backhaul network;
exchange collaboration data with at least one other access point of the additional access points via the backhaul network, the collaboration data including media access control (MAC) personality data and replicated PHY protocol data that corresponds to a PHY communication protocol used by the access point to communicate with at least a first station of the one or more stations, to switch communication with the first station from the access point to the at least one other access point transparently to the first station;
determine when the at least one other access point has established a first communication link with the first station via a replicated PHY protocol corresponding to the replicated PHY protocol data; and
transfer the MAC personality to the at least one other access point when the at least one other access point does not meet predetermined connection criteria for the first station.

2. The access point of claim 1, wherein
the circuitry is further configured to transmit the replicated PHY protocol data to one or more of the additional access points configured to communicate with the first station based on predetermined connection criteria for the first station.

3. The access point of claim 2, wherein
the predetermined connection criteria include performance-based or non-performance-based connection criteria.

4. The access point of claim 3, wherein
the performance-based connection criteria include at least one of signal strength, time of arrival, positioning coordinates, motion prediction data, or PHY replica data.

5. The access point of claim 3, wherein
the non-performance-based connection criteria include load balancing criteria.

6. The access point of claim 1, wherein
the circuitry is further configured to terminate a second communication link with the first station when one or more disconnection criteria are met and the at least one other access point has established the first communication link with the first station.

7. The access point of claim 1, wherein
the circuitry is further configured to simultaneously implement the one or more PHY protocols via a software defined radio (SDR).

8. The access point of claim 1, wherein
the circuitry is further configured to forward received PHY protocol replicas to the additional access points.

9. The access point of claim 1, wherein
the circuitry is further configured to communicate with the one or more stations via a replicated PHY protocol with unmodified communications parameters to cause a physical access point shift that is transparent to the one or more stations.

10. The access point of claim 1, wherein
the circuitry is further configured to detect one or more blocker signals associated with one or more transmitted signals from the additional access points to the one or more stations.

11. The access point of claim 10, wherein
the circuitry is further configured to simultaneously transmit blocker cancellation signals to the one or more stations based on at least one of information associated the one or more blocker signals or side information.

12. The access point of claim 11, wherein
the circuitry is further configured to generate the blocker cancellation signals based on received channel information from the one or more stations via a reverse-link communication channel.

13. The access point of claim 12, wherein
the circuitry is further configured to exchange the received channel information with the additional access points via the backhaul network.

14. The access point of claim 1, wherein the circuitry is configured to:
transfer the MAC personality data for the first station to the at least one other access point via the backhaul network; and
receive, via the backhaul network, a transfer confirmation message that the at least one other access point has received and implemented the MAC personality data for the first station.

15. The access point of claim 14, wherein
to switch communication with the first station from the access point to the at least one other access point transparently to the first station includes the station communicating with the at least one other access point with unmodified communications parameters resulting in a physical access point shift that is transparent to the first station.

16. An access point comprising:
circuitry configured to
implement a PHY communication protocols to communicate with a mobile terminal via a wireless communication link;
communicate with another access point via a backhaul network;
transmit media access control (MAC) personality data and replicated PHY protocol data that corresponds to a PHY communication protocol used by the access point to communicate with the mobile terminal to the another access point via the backhaul network to cause the mobile terminal to switch from communicating with the access point to communicating with the another access point transparently without the mobile terminal performing a handoff process between the access point and the another access point;
determine when the another access point has established a first communication link with the mobile terminal via a replicated PHY protocol corresponding to the replicated PHY protocol data; and
transfer the MAC personality to the another access point when the another access point does not meet predetermined connection criteria for the mobile terminal.

* * * * *